Inventors:
Jerome J. Kanter &
Watt V. Smith;
By Joseph O. Lange, Atty.

April 16, 1946.   J. J. KANTER ET AL   2,398,746
VARIABLE VELOCITY IMPACT TESTING MACHINE
Filed July 8, 1942   9 Sheets-Sheet 5
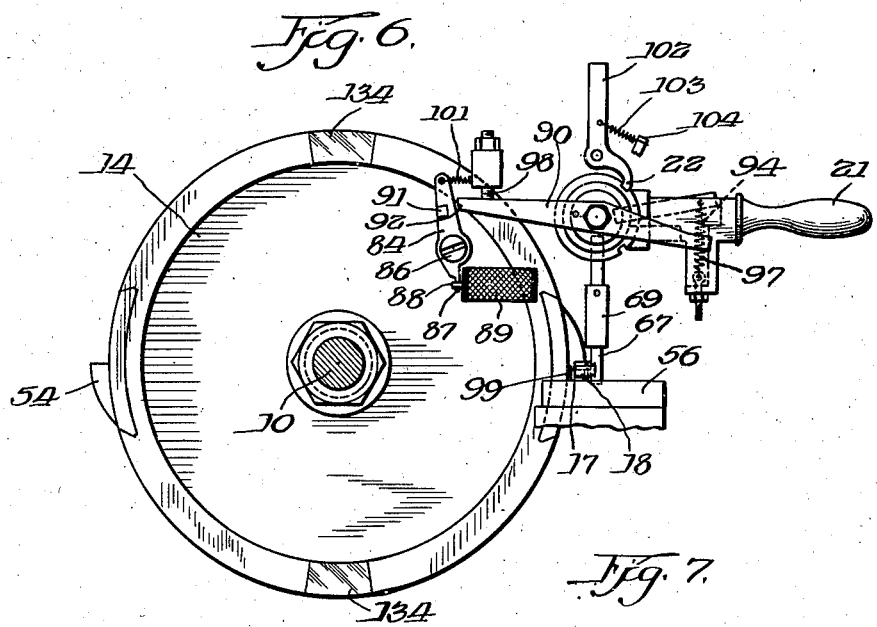
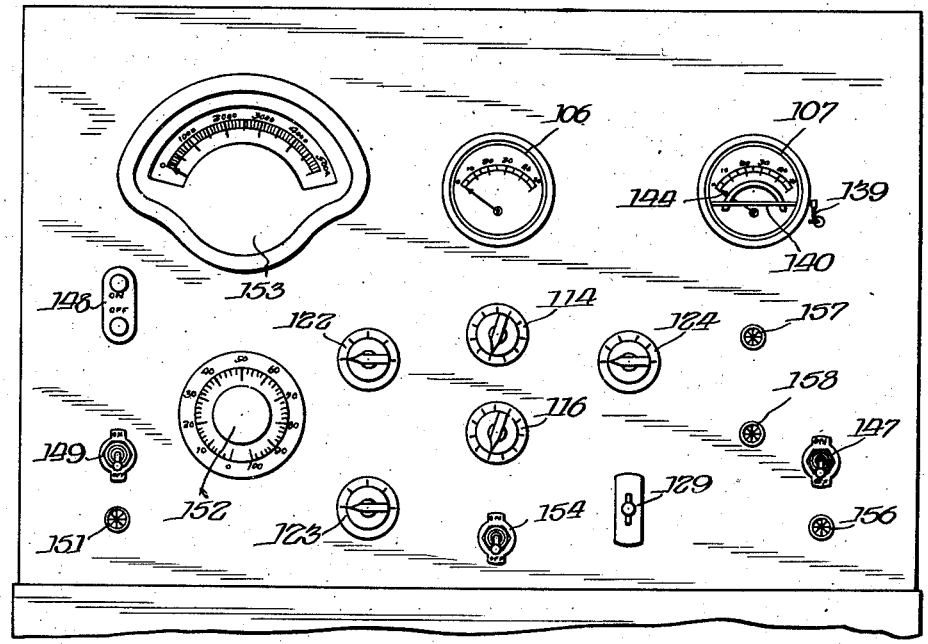
Inventors:
Jerome J. Kanter, &
Watt V. Smith;
By: Joseph O. Lange   Atty.

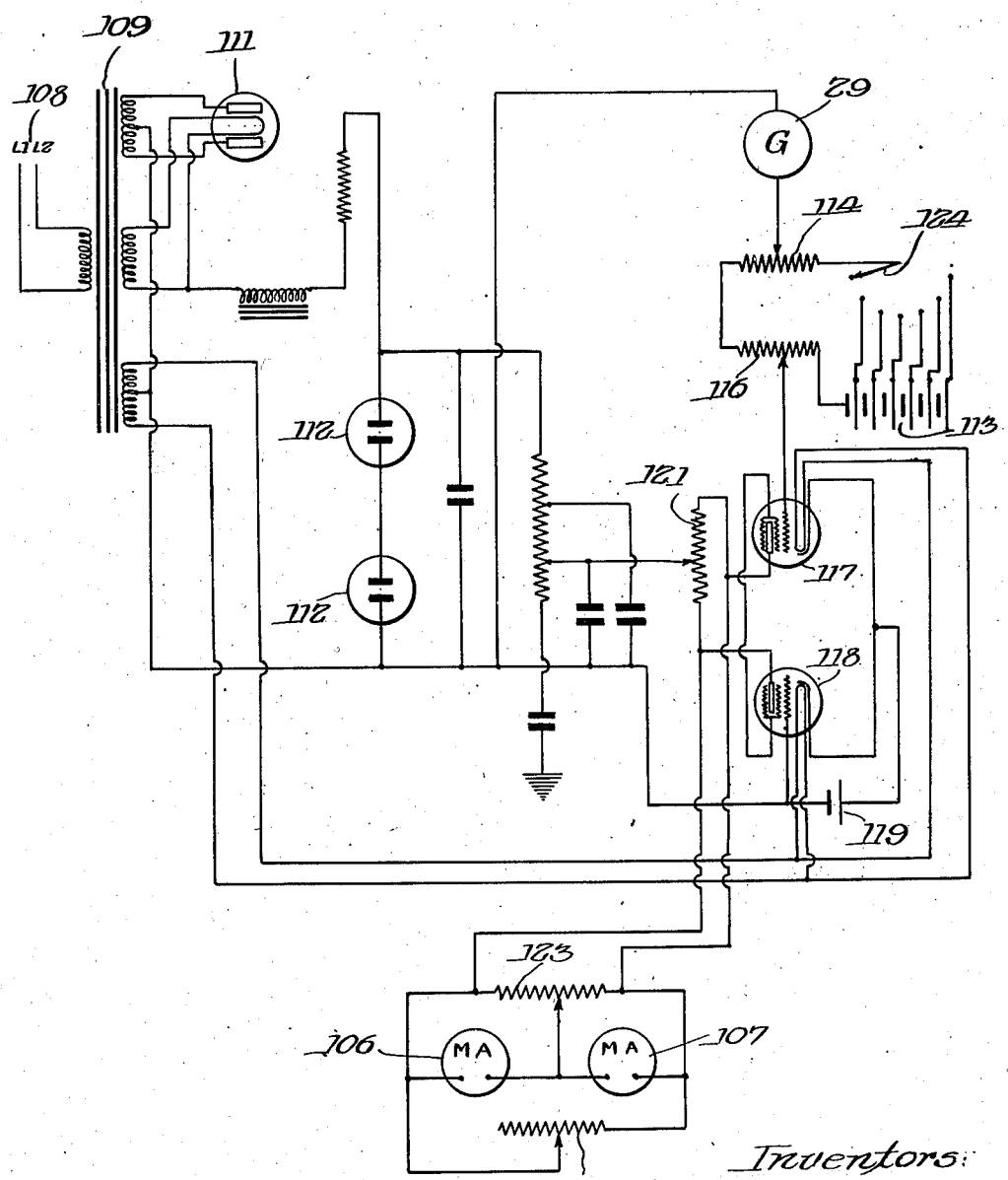

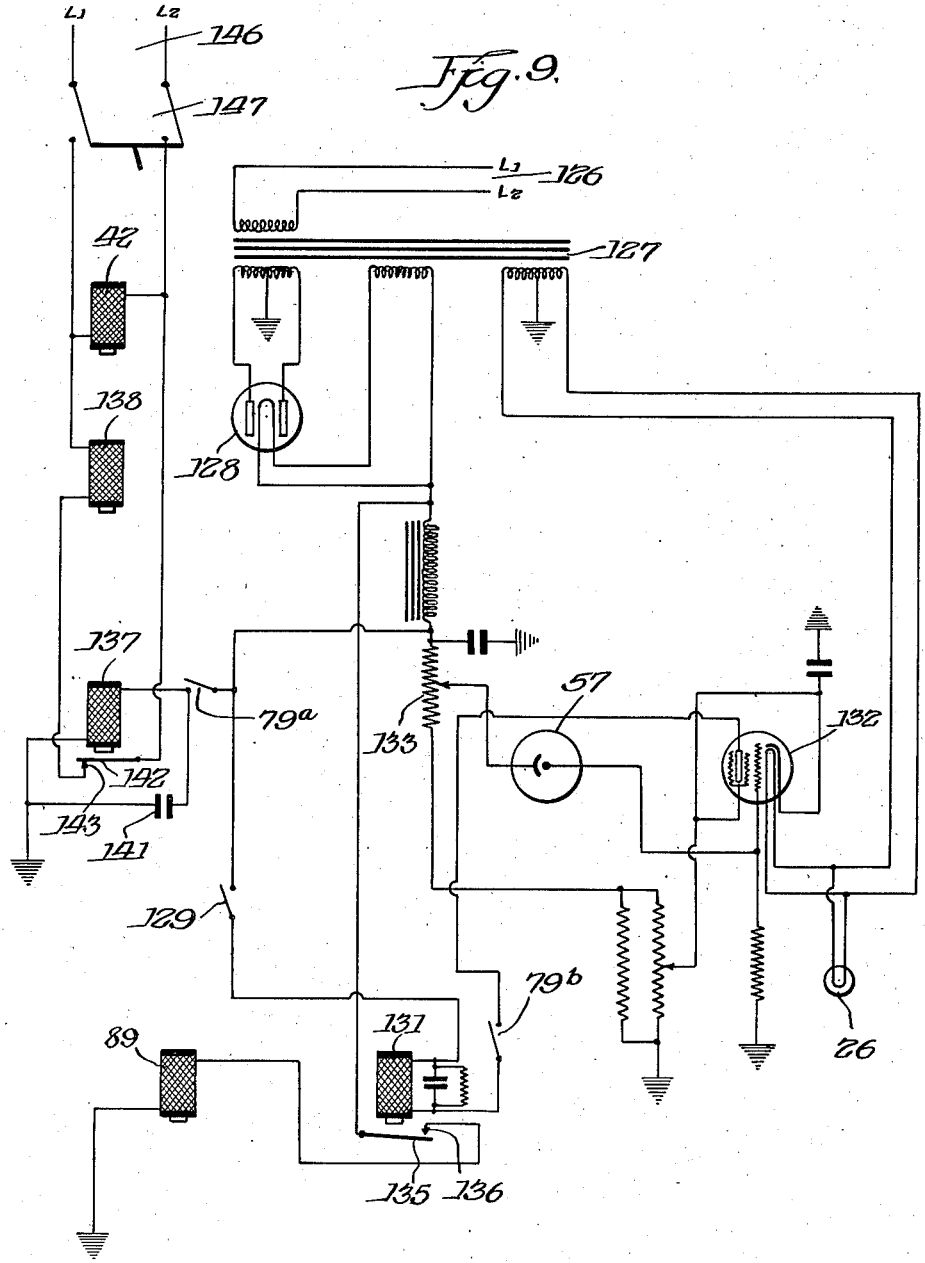

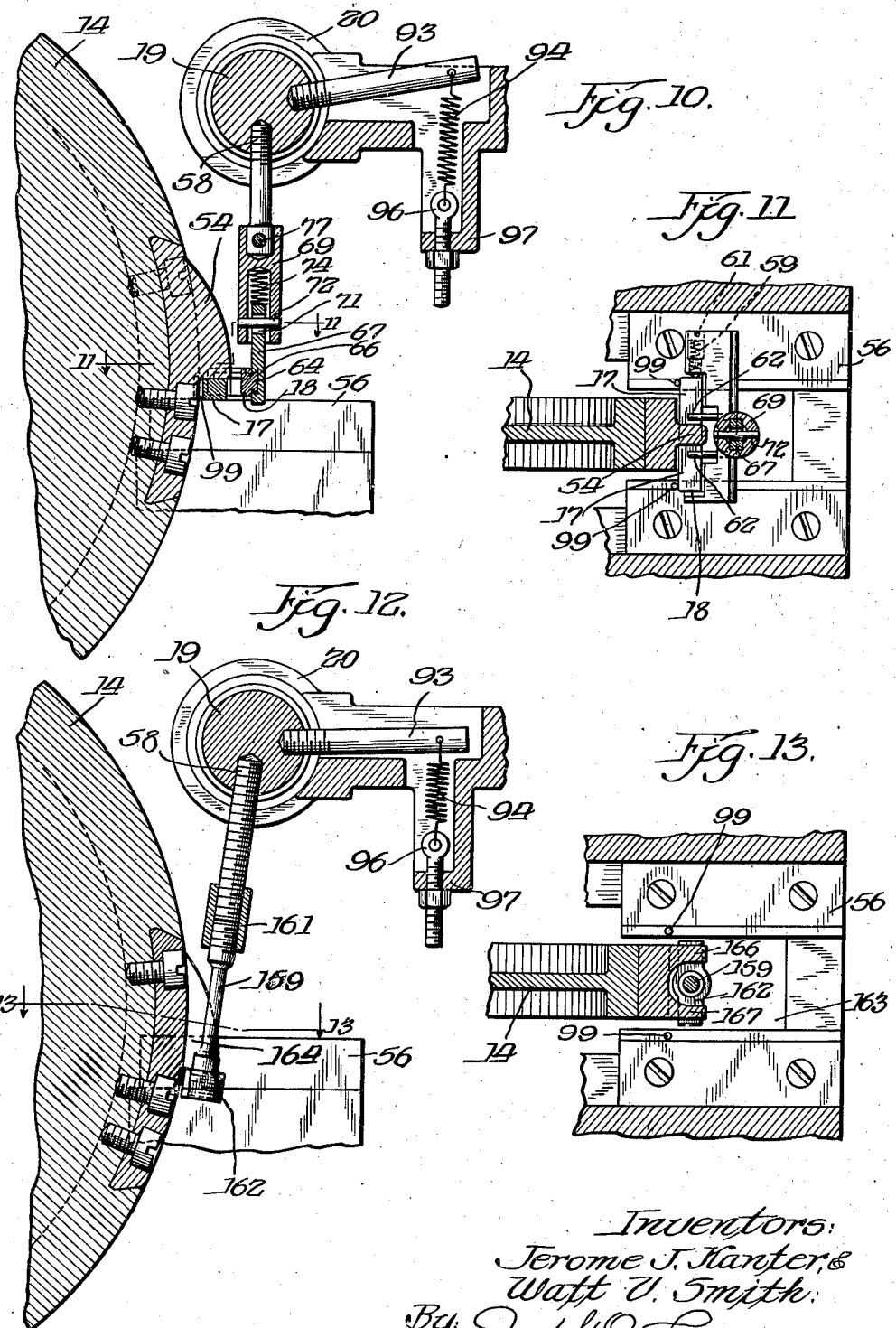

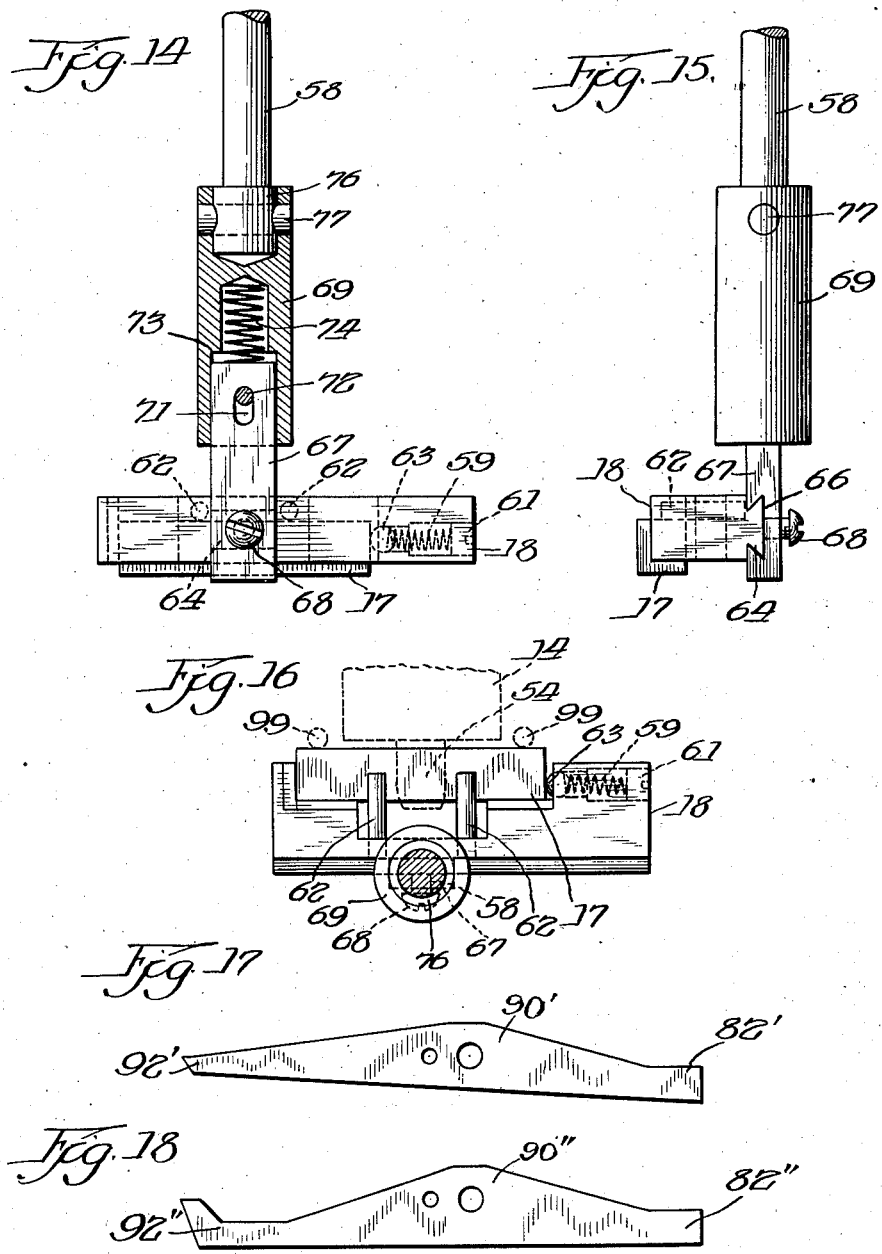

Patented Apr. 16, 1946

2,398,746

UNITED STATES PATENT OFFICE 2,398,746

VARIABLE VELOCITY IMPACT TESTING MACHINE

Jerome J. Kanter, Palos Park, and Watt V. Smith, Chicago, Ill., assignors to Crane Co., Chicago, Ill., a corporation of Illinois Application July 8, 1942, Serial No. 450,206

10 Claims. (Cl. 73—101)

This invention relates to a novel testing machine and more particularly to a new and improved variable velocity impact testing machine.

At the outset, explanation is offered that primarily an impact testing machine comprises a moving mass which strikes a specimen of the material to be tested and employs a means for measuring the change in kinetic energy of the moving mass. Or, to express it differently, measurement is made by this type of machine of the energy absorbed by the particular test specimen upon being struck by the moving mass.

There are several types of impact testing machines available but none of these has proved to be entirely satisfactory especially insofar as impact testing at variable speeds is concerned. Probably the better known of such machines is the pendulum type of testing machine which is used for the testing of small specimens which are placed horizontally with the ends supported by an anvil. The hammer strikes the test specimen midway between the supports and after breaking the specimen continues its swing upwardly. The energy expended in breaking the specimen is a product of the weight of the pendulum and the difference between its height of fall and the height of rise. The pendulum machine is however limited in the scope of its usage inasmuch as the velocity of the pendulum for a particular machine is substantially fixed and may be varied only slightly. The relatively fixed velocity of the pendulum types of impact testing machines is usually about 15 feet per second. It has been demonstrated in research investigations that the impact resistance strength of a material is a function of the velocity of impact as well as of temperature, and that for each metal there probably is a critical velocity which, if exceeded, causes the material to appear brittle. Thus the terms tough or brittle as applied in the description of the properties of any material are merely expressions relative to the velocity at which the material is tested. The real problem in impact testing is to determine how far the critical velocity which renders the material brittle in behavior is removed from the contemplated service velocity rather than comparisons of impact strength at a fixed velocity. Testing velocities required to produce brittleness failures have been found to exceed 200 feet per second for some materials. Thus it is apparent then that a variable velocity testing machine is desirable in order to study comprehensively the impact properties of a wide variety of materials.

Accordingly a principal object of this invention is to provide a variable velocity impact testing machine which is accurate, mechanically efficient and is convenient and easy to operate under all conditions. It is true that machines for variable velocity impact testing have been previously designed, but these prior machines have been subject to serious criticism from mechanical considerations and none of them has given recordings satisfactory for interpretation as to the energy absorbed by the specimen during the test.

Another important object of this invention is to provide a variable speed impact testing machine which employs an automatic specimen insertion means that insures the proper positioning of the specimen to be tested. The specimen is brought to rest at a point immediately below the striking edge or dog on the impact wheel in less than one-half revolution of the wheel regardless of the speed of the impact wheel. The latter arrangement thereby prevents any attempted insertion of the specimen simultaneously with the passing of the impact dog which might otherwise be the cause of an accident.

Another important object of this invention lies in the provision of a novel indicating means for the energy change in the variable velocity impact testing machine during a test which includes a D. C. generator directly operated by the multispeed impact wheel and arranged to act as a tachometer. A vacuum tube amplifier circuit used with the tachometer circuit allows for the quantity of current generated to be recorded on a microammeter, and a "freezing" of the pointer of the microammeter occurs immediately after the breaking of the specimen whereby a stationary indication of the reduced current is registered in microamperes. Since the change in energy results in a change of speed and a consequent change in E. M. F., the difference in microampere readings before and after breaking the specimen thereby denotes the amount of kinetic energy absorbed by the specimen when broken by the novel variable velocity impact rotor.

Another and still further important object of this invention is to provide a variable speed motor for driving the impact wheel through a clutch arrangement and a solenoid operated in cooperation with the clutch to automatically disengage the motor from the impact wheel before the test specimen is fractured.

Other and further important objects will become apparent from the disclosures in the accompanying drawings and following specification.

In the drawings:

Fig. 6 is a view similar to Fig. 5 of the test specimen positioning means with the specimen at the impact or breaking position.

Fig. 7 is a front view of the instrument panel of the variable velocity impact testing machine of this invention.

Fig. 8 illustrates the wiring diagram for the speed change amplifier used in this machine.

Fig. 9 shows another wiring diagram of the photoelectric cell amplifier circuit used in conjunction with the operation of this machine.

Fig. 10 is an enlarged fragmentary sectional view through the center of the rotor of this machine and showing the positioning device with the specimen in its breaking position as shown in Fig. 6.

Fig. 11 is a sectional view taken on the line 11—11 of Fig. 10.

Fig. 12 is a fragmentary sectional view similar to Fig. 10 and incorporates a tensile type of test specimen.

Fig. 13 is a sectional view taken on the line 13—13 of Fig. 12.

Fig. 14 is a front elevation of the test specimen holder partially in section.

Fig. 15 is a side elevation of the specimen holder as shown in Fig. 14.

Fig. 16 is a plan view of the specimen holder shown in Figs. 14 and 15.

Fig. 17 shows a novel trigger arm used in conjunction with the device as shown in Figs. 10 and 11.

Fig. 18 shows a modified trigger arm used in conjunction with the device as shown in Figs. 12 and 13.

As shown in the drawings:

Figure 1:
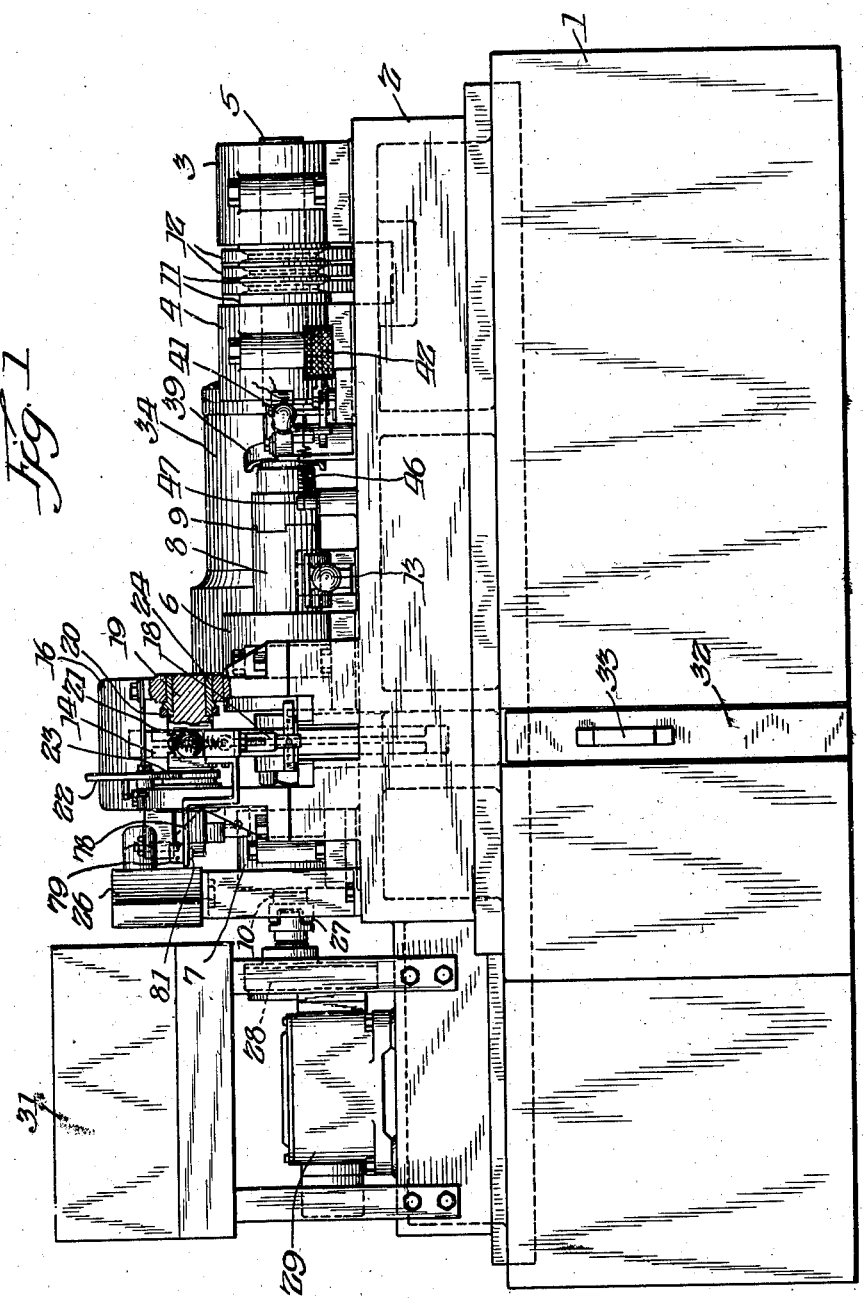
Fig. 1 is a front assembly view of the variable velocity impact machine of this invention.

Referring more specifically to Fig. 1, the reference numeral 1 indicates generally a concrete base or the like for supporting the variable velocity impact testing machine. The latter device comprises a main framework 2 upon which is mounted the journaling bearing blocks or supports 3, 4, 6 and 7, suitably aligned to receive a shaft 8 therethrough. The shaft 8 is divided by a clutch 9 into the segments 5 and 10. A series of sheaves 11 are mounted between the bearing blocks 3 and 4 and positioned on the segment 5 of the shaft 8, the sheaves having V-shaped grooves and adapted to be driven by the belts 12. A hand brake lever 13 is provided for the purpose of slowing down and stopping the shaft segment 10 when the clutch 9 is disengaged. Mounted between the bearing blocks 6 and 7 is the main rotor 14 over which there is positioned a guard or cover 16, the latter being more clearly shown in Fig. 3.

The specimen to be impact tested is supported within the holder 18. The holder 18 is supported on the shaft 19 operated by the loading lever 21. The loading lever 21, as later described, is preferably not rigidly connected to the shaft 19 but merely has a spring connection therebetween, and the base of the lever 21, as shown at 20, is journaled on the bearing 24 surrounding the shaft 19. The superimposed shaft or lever base 20 is maintained in its several positions by the pawl 22 pivotally attached to a portion of the frame 2 and which engages the notches 23 in the member 20. A lamp 26 is provided to excite a photoelectric tube. A coupling 27 joins the shaft 10 to the gear 28 upon which the rotor 14 is keyed, which thus operates the direct current generator 29. The photoelectric amplifier is designated at 31. After being struck by the rotor, the severed portion of the test specimen will be traveling at high velocity. Therefore a receptacle 32 for catching the broken pieces of the test specimen is provided within the base of the machine 1. The drawer or receptacle 32 is slidably movable transversely within the base by manual actuation of the handle 33 so as to permit withdrawal of the specimen for inspection or the like. The drawer interior is suitably padded so as to prevent injury to the specimen from the impact when it is received therewithin.

Figure 2:
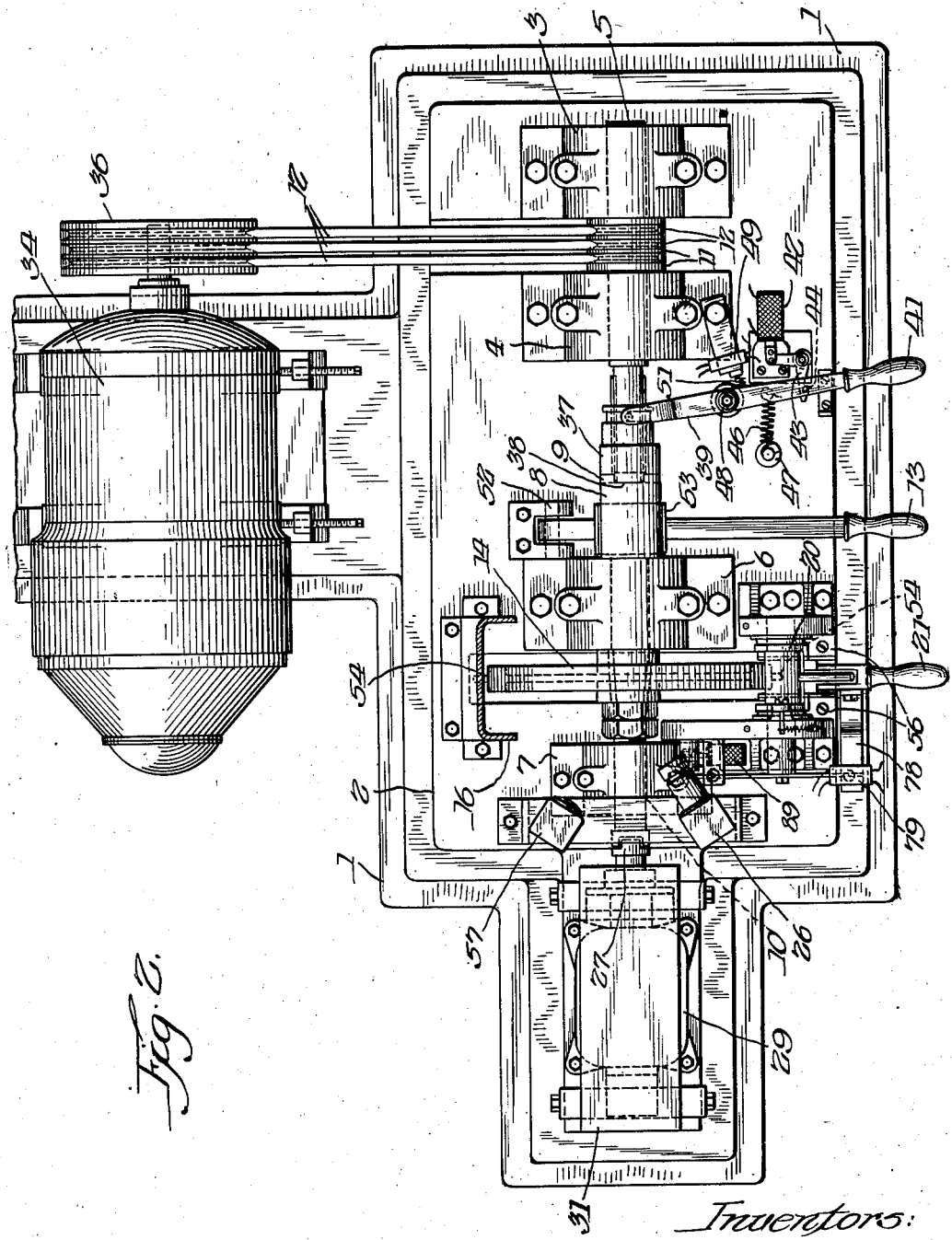
Fig. 2 is a top plan view of the machine as shown in Fig. 1.

Referring now to Fig. 2 of the drawings, the V-belts 12 are preferably driven by a variable speed motor 34 driving the pulley or sheaves 36. The clutch 9 is equipped with a sliding jaw 37 mounted on and rotatable with the shaft 5 which engages the stationary jaw 38, a unitary part of the shaft 10. The sliding jaw 37 is actuated by means of the lever arm 39 and may be operated either manually by the handle 41 or else electrically by means of the solenoid 42. The latter member, when energized, causes the rocker arm 43 to disengage the pin 44 on the arm 39, thereby permitting the spring 46 to pull the lever arm 39 towards its anchor post 47 about the pivot point 48, and thereby effect a disengagement of the sliding clutch jaw 37 with the stationary clutch jaw 38. A clutch indicator switch 49 is actuated by the spring 51, being expanded and contracted by means of the lever arm 39. The brake handle and the lever 13 is pivoted about a point 52 and acts to lift the semi-circular brake band 53 upwardly against the underside of the shaft 10.

The impact wheel 14 is shown in more detail in Figs. 3, 4, 5, 6, 10 and 12 and, as can be seen, is preferably equipped with diametrically opposed striking dogs 54 extending outwardly from the periphery thereof. At the front end of the rotor or impact wheel 14 an anvil 56 is positioned as better shown in Figs. 10 and 11, and upon which the test specimen 17 of the material to be tested is placed. By means hereinafter described at length, it is thereupon injected closely adjacent the periphery of the impact rotor 14 at a predetermined time other than when either of the impact striking dogs 54 is passing the immediate location of the anvil 56. In order to effect this very accurately timed operation a photoelectric cell 57 is provided which is actuated by the reflection of the lamp 26 from a predetermined shiny portion on the side surface of the rotor 14. The energy occasioned by this reflected light is amplified by the photoelectric cell amplifier circuit as shown at 31, and as set forth in more detail in Fig. 9.

Figure 4:
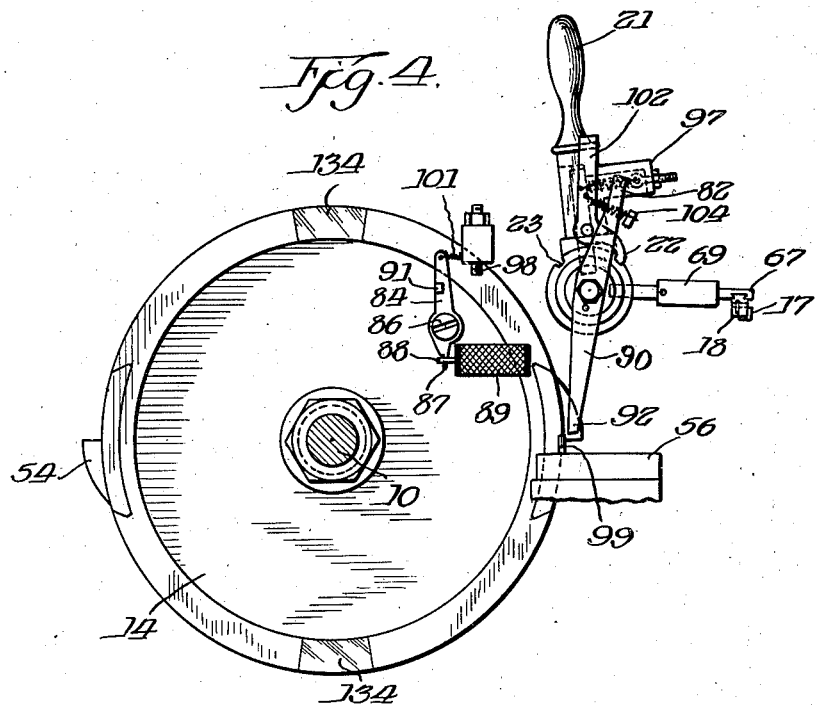
Fig. 4 is a fragmentary view of the specimen positioning mechanism and shown in a test specimen loading position.

The test specimen loading mechanism as shown in Figs. 4, 5, 6, 10 and 12, is provided with the hand lever 21 and base member 20 rotating about the bearing 24 which telescopes the internal shaft 19 to which the specimen holder 18 is bolted by means of the threaded shank 58, as best shown in Figs. 10 and 12. The test specimen of material is of a recognized or standard size and is positioned in the holder 18 when the lever handle 21 is in an upright position as shown in Fig. 4. The test specimen 17, as shown in the latter figure, is positioned in the holder 18 and is held firmly in place by the guide pin 62 and a ball 63 under compression by means of the spring 59 and the adjusting screw 61 (see Fig. 14). The holder 18 is equipped with a dovetailed tongue 64 running across the back thereof and engages a similarly shaped groove 66 in the rectangularly shaped member 67, thereby forming a dovetailed slidable joint. The latter arrangement permits accurate positioning of the specimen holder with relation to the anvil 56. After the holder has been properly centered, the set screw 68 is tightened and thus prevents further movement of the specimen holder with reference to the connection between the holder 18 and the shaft 19.

Figure 5:
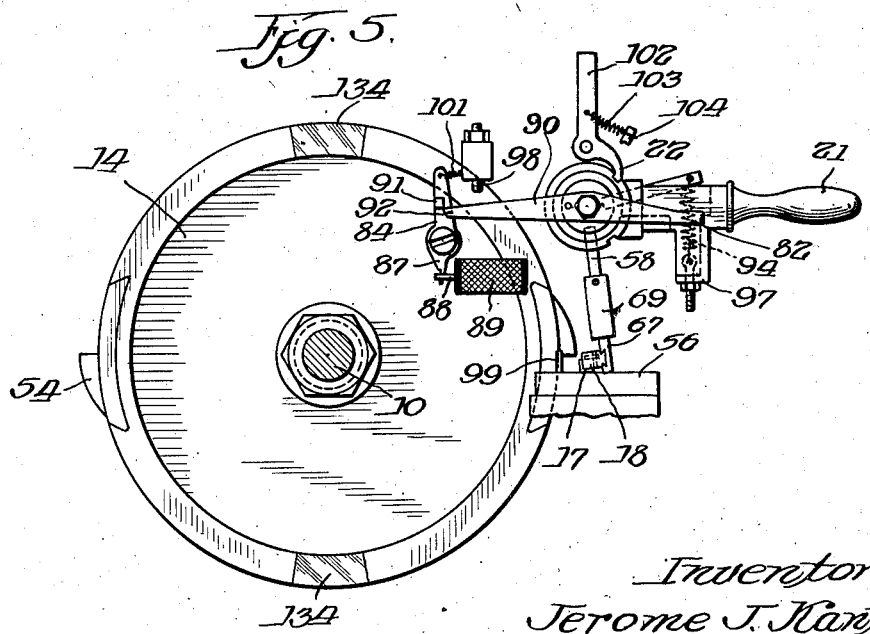
Fig. 5 is a similar view to that shown in Fig. 4 with the test specimen positioning means advanced to a cocked position.

The connection between the holder 18 and the shaft 19 consists of the shank member 58 which threadedly engages the shaft 19 and the member 67 to which the holder 18 is immediately attached, with the coupling 69 therebetween. As best shown in Fig. 14, the member 67 supplied with a slot 71 is permitted reciprocable movement upon the pin 72 which is fixedly attached to the coupling member 69 and limits outward movement of the member 67 from the coupling 69. The coupling 69 is provided with the shouldered bore as shown at 73 to limit the inward movement of the member 67, and also provides for the housing of the spring 74 in the reduced bore diameter. The spring 74 thus acts to push the member 67 outwardly to its maximum position as determined by the pin 72. The foregoing arrangement provides the specimen holder with a much desired flexibility when the specimen 17 and the holder 18 are brought down upon the anvil 56, as best shown in Fig. 5. Otherwise, as is evident, it would be very difficult to adjust the length of the connection member between the shaft 19 and the holder 18 so that the specimen would rest completely and solidly upon the anvil 56. Without the flexibility referred to, the attempt to adjust the test specimen and holder would result in its resting at a position above the anvil in order that the specimen holder 18 would not be damaged if the adjustment were too long. Subsequently, however, upon movement into position upon the anvil, it would strike the anvil and cause damage thereto. Completing the description of this novel arrangement, the threaded shank 58 projects into a bore 76 at the opposite end of the coupling 69 and is held in place by the pin 77 (Figs. 14 and 15).

Figure 3:
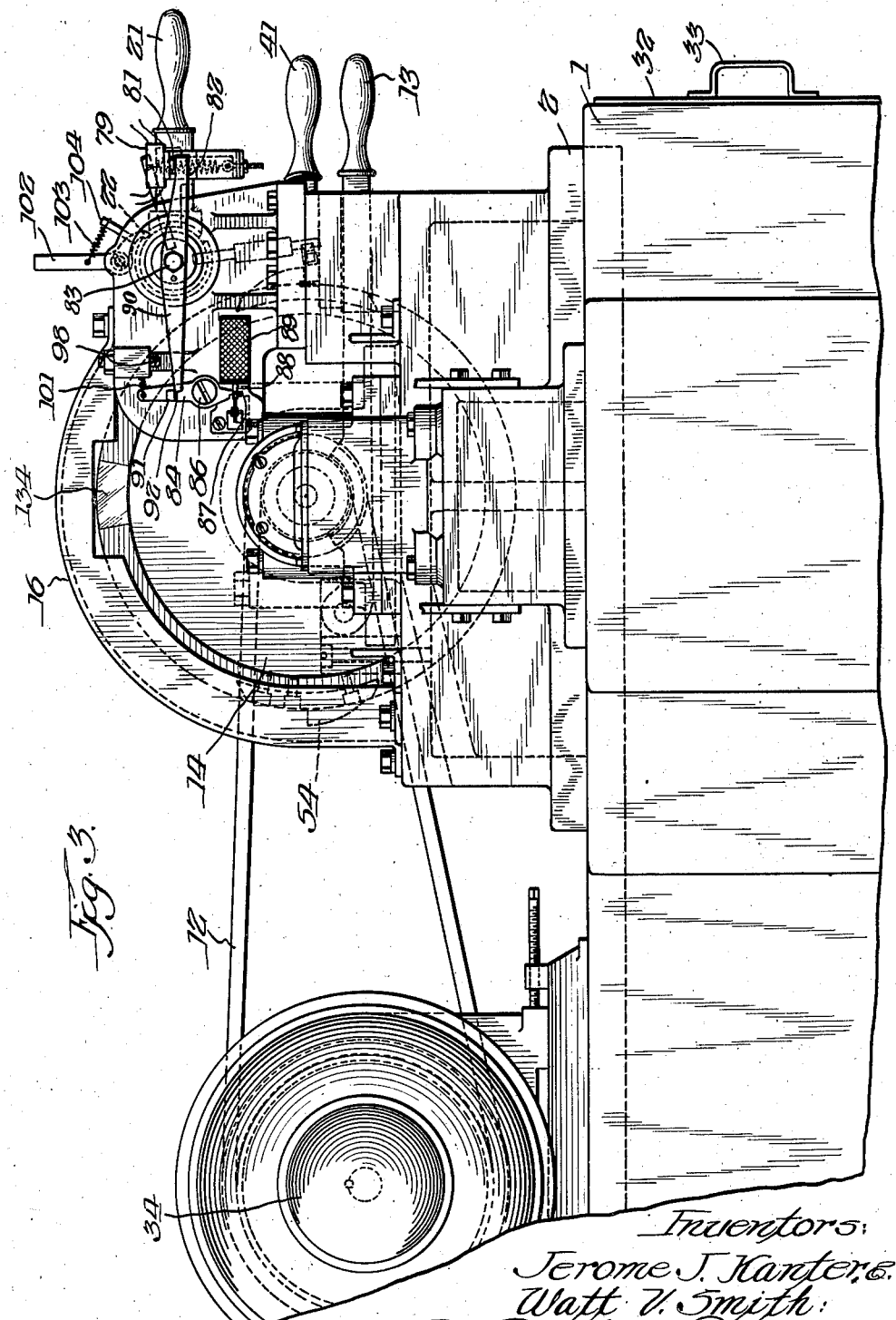
Fig. 3 is an end elevational view of the machine of this invention.

Per Figs. 2 and 3, the loading lever 21 rotating about the line bearing 24 is provided with the bracket 78 integrally mounted thereon and on its outer extremity the two-part electrical switch 79 is mounted with an actuating button 81 beneath the bracket arm 78. Accordingly, the switch button 81 is actuated by the right end portion of the apertured trigger arm 90 as shown at 82, the trigger arm being mounted relatively non-rotatable to the shaft 19, as indicated. As hereinafter described in greater detail, the modified trigger arms 90 'and 90'' shown in detail respectively in Figs. 17 and 18 are selectively attachable to the central shaft 19 at 83, depending on the type of test desired. A rocker arm or pivotable lever 84 is mounted on the framework, as indicated at 86, with the lower end of the lever arm being attached as at 87 to the core 88 of the solenoid 89, all of which is more clearly shown in Figs. 3 to 6 inclusive of the drawings. The upper extension of the rocker arm 84 is provided with a catch or lug 91 which, in its normal position, serves to hold the left end of the trigger arm 92 in a restrained position when the loading lever 21 is being maintained in the cocked position, as shown in Figs. 3 and 5. As best shown in Fig. 4, in the loading position the trigger arm 90 is preferably offset from the loading lever 21 by an angle of approximately 20 degrees and in that position the switch 79 does not contact the actuator 81. After inserting the specimen 17 which is to be tested in the loading position, the lever arm 21 together with its associated bracket 78 is rotated around to a horizontal position, as shown in Fig. 5. During the larger portion of the said latter movement, the shaft 19, the member 20, and the lever 21 move as a unit until such time as the left end portion 92 of the trigger arm 90 contacts the lug 91 on the rocker arm 84. Concurrently with such contact and continuing on downwardly to the horizontal position of the lever handle 21, as shown in Fig. 6, the internal shaft 19 remains stationary. The latter independent movement of the loading lever 21 thereupon causes the switch actuator 81 to be compressed by the end 82 of the trigger arm, as shown in Fig. 3. Immediately upon actuation of the solenoid 89 its core 88 is drawn inwardly and similarly the lower end of the rocker arm 84 is drawn with it. Thus the rocker arm 84 is pivoted about the point 86 so that the catch 91 is moved to the left and the end portion 92 of the trigger arm 90 is permitted to pass upwardly which simultaneously accomplishes a release of the switch actuator 81 and an opening of the switches 79.

As shown more clearly in Fig. 10, the simultaneous movement of the shaft 19 and the member 20 is effected by their use of a novel spring connection which employs the stud 93 threadedly engaging the internal shaft 19 and its outer end attached by means of a spring 94 to an eye bolt 96 threadedly engaging a depending portion 97 of the outer shaft 20 and the integral loading lever 21. Upon the loading lever 21 reaching the position as shown in Fig. 5, the trigger arm 90 will then be subjected to spring tension by reason of the fact that at this point the shaft 19 has been separated or restrained from movement with the lever 21 and its superimposed shaft base member 20 to a position in which the spring 94 has been fully extended. Hence upon retraction of the lug 91, the inner shaft 19 is enabled to resume its normal relationship with the lever 21 and the outer shaft 20 because of the spring 94 resuming its normal position and degree of extension. The rotative movement of the internal shaft 19 is limited by the arrangement of the trigger arm 90 striking the adjustable stop 98 as better shown in Fig. 6. At this stage the test specimen 17 and its holder 18 have been moved to a position closely adjacent the external periphery of the rotor 14. The inward movement of the test specimen 17 is further limited by the guide pins 99 positioned in both sides of the anvil 56. Thereafter upon de-energizing the solenoid 89, the spring 101 pulls the rocker arm 84 back to its normal substantially vertical position. At this time, the pawl 22 and its manually operable, upwardly projecting arm 102 is held in a forward position and is maintained within the slot 23 by means of the spring 103 attached to the fixed pin 104.

Directing attention now to Fig. 8, the change speed amplifier circuit shown therein is designed to give a large difference in reading on the microammeters 106 and 107 for a small change in speed of the rotating disc 14. Alternating current is supplied at 108 and courses through a transformer 109 to a rectifier tube 111 for converting alternating current to direct current and, in addition, the two voltage regulator tubes 112 combine to furnish a constant direct current voltage. The direct current generator 29, which is geared directly to the shaft of the impact machine, has an output that is proportional to the speed of the machine. The output of this machine is opposed to the output of a series of six 1½ volt dry dry cells shown at 113, through a pair of variable resistances 114 and 116 that enables a very small difference in potential to be established between the output generator 29 and the dry cells 113. This difference in potential is constant so long as the speed of the shaft 10 remains constant, but readily varies with any changes in the speed of the shaft. This difference in potential is applied to the grid of the pentode tube 117, which is arranged in parallel with a similar pentode tube 118. The corresponding grid in the tube 118 is held at a constant potential by use of a 1½ volt dry cell shown at 119. Power is supplied to the plate of the two pentode tubes 117 and 118 from opposite ends of a variable resistance 121, which arrangement permits establishing a small constant difference in potential between the tube plates when the grids are maintained at a constant potential. The series wired microammeters 106 and 107 are connected across the plates to measure the flow of current caused by the difference in potential between the plates of the tubes 117 and 118. Any variation in grid voltage on the 117 tube is amplified and indicated by the microammeters 106 and 107. Such a variation would be caused by a change in the speed of the shaft 10, which in turn is caused by the energy absorbed in the breaking of the specimen 17 by the impact of the striking dog 54. The difference in microammeter readings after a definite time interval, obtained when slowing down without breaking a specimen and that obtained after the same time interval when a specimen is broken, is taken as the index to the material's resistance to fracture. The microammeters 106 and 107 have a variable shunt resistance 122 in parallel therewith and another variable rheostat 123 for balancing the microammeters. The introduction of one or more of the six 1½ volt dry cells shown at 113 is accomplished by the range switch 124, as shown in Fig. 8, and also on the control panel of Fig. 7.

The photoelectric amplifier 31 is concerned with inserting the specimen 17 into the path of the moving striker 54 at the proper time and with maintaining the reading of the microammeter 107 after a definite interval of time. As best shown in the wiring diagram of Fig. 9, the photoelectric amplifier consists of a source of electromotive force at 126, running to a transformer 127, and thence to a rectifier tube 128, which transforms the alternating current to direct current. The amplifier is intended to function only when the specimen holder 18 on the machine is in the cocked position, as shown in Fig. 5. Under this condition the switches 79a and 79b are in a closed position and upon closing the panel switch 129 the circuit is completed through the breaking switch 79a, thence through the coil of a relay 131, and subsequently through the breaking switch 79b, to the plate of the pentode tube 132. The latter tube will not pass current unless the grid controlled by the photoelectric cell 57 is at the proper potential. The photoelectric cell 57 is supplied with current from a variable resistance 133 and permits the passage of current only when a light beam falls on the tube element. This light beam from the lamp 26 is controlled by brightly polished areas 134 (shown on Figs. 4, 5 and 6) on the rim of the impact wheel 14 and is flashed onto the photoelectric cell with each half revolution of the wheel thereby providing for one or the other striking dogs 54 to engage the test specimen 17.

This energizing of the photoelectric cell 57 permits the passage of current through the pentode tube 132 and energizes the coil of relay 131, causing the contacts 135, 136 to close and thereby actuate the breaking solenoid 89 to operate and release the trigger 90 of the impact machine thereby causing the specimen 17 to be placed in the path of the striker 54 at the proper instant. The latter movement of the trigger arm 90 causes the switches 79a and 79b to open and release the contact of the relay 131 and the relay 137. The relay 137 controls the solenoid 138 which establishes the microammeter reading as shown on microammeter 107 by means of a linkage 139 operatively connected to the core (not shown) of the solenoid 138 and the cross arm 140 which acts to hold the meter pointer 144 in a stationary position. The condenser 141 retains sufficient voltage to continue to actuate the relay solenoid 137 for a definite interval of time before allowing the contact points 142 and 143 to close and to thereupon cause the solenoid 138 to fix the position of the pointer 144 of the meter 107. An additional supply of electric current is placed into the circuit, as indicated at 146, and is controlled by the switch 147. When the switch 147 is closed it acts immediately to energize the clutch solenoid and thereby disengage the clutch and allow the rotor 14 to operate free of the motor 34. The meter position-fixing solenoid 138 is positioned in series with the line 146, in contradistinction to the clutch solenoid 42 which is in parallel with the line 146. Inasmuch as the switch 147, which acts to operate the disengagement of the clutch by means of the solenoid 42, is not employed until such time as the specimen holder and loading lever are in cocked position, as shown in Fig. 4, the circuit supplied by the electric current at 146 is not completed, at least insofar as the position-fixing solenoid is concerned, because the solenoid 137 is energized and has caused the contact points 142 and 143 to separate, making a break in the circuit. Attention is directed to the fact that upon releasing the trigger arm 90 the switches 79a and 79b resume their normal open positions and as soon as the residual energy is absorbed from the condenser 141 the contact points 142 and 143 resume their normal closed position, thereupon effecting the fixed positioning or freezing of the microammeter 107 by the deenergizing of the solenoid 137 and a simultaneous energizing of the solenoid 138.

Referring now to the panel arrangement of Fig. 7, the controls may be further explained for clarification of understanding. The motor switch 148, the motor field switch 149, and a small indicator lamp 151 are preferably wired so that when the motor field switch is closed the light will be on. The rotative speed of the motor is controlled by the motor field rheostat 152 and the speed indicator preferably recording in revolutions per minute is indicated at 153. The switch 154 controls the alternating current electromotive force which is to be applied to the photoelectric circuit amplifier and also to the change speed amplifier shown at 108 and 126 in Figs. 8 and 9. The clutch solenoid switch 147 is preferably provided with a small indicator lamp 156, which likewise lights up when the switch is in the closed position. Additional indicating lamps, designated 157 and 158, are operated by the switch 49, which is associated with the clutch, so that when the latter member is engaged the lamp 157 is lighted, but when the clutch is disengaged the lamp 158 is lighted which automatically turns off the lamp 157.

It will be apparent from Figs. 10, 11, 12 and 13 that the variable velocity impact machine of this invention is capable of performing at least two types of tests, that is, the regular impact test which comprises a single striking dog 54, and adapted to strike substantially transversely the specimen to be tested, which is positioned upon an anvil, near its middle thereby either breaking or bending the specimen. This regular impact test apparatus is shown in detail in Figs. 10 and 11. As best shown in Fig. 12, the apparatus is also adapted to make tension tests of standard test specimens, such as that shown at 159. The upper portion of the test specimen 159 is threaded into a coupling 161, with the other end of the coupling receiving the threaded stud 58, also threadedly engaging the internal shaft 19. A cross member 162 is threaded onto the lower end of the test specimen 159. This specimen 159 and/or its cross member 162 preferably does not rest upon nor touch the anvil 56, but rather extends downwardly within the space 163 of the anvil 56, to a position in which the test specimen 159 is placed closely adjacent the periphery of the rotor 14 and at a point where the test specimen is substantially tangent to the circumference of the rotor 14. A modified striker 164 is employed to perform the tensile test on the specimen 159. The novel modified form of striker 164 herewith illustrated and described is provided with the fork-like prongs 166 and 167, as more clearly shown in Fig. 13, and thus does not actually strike the test specimen 159 but rather hits the cross member 162. In so doing it is enabled to stretch or to pull the specimen 159 apart under a combined high tension and impact load. Inasmuch as the internal shaft 19 must be moved further in the tensile testing apparatus in order that the specimen obtain a position of substantial tangency with the rotor 14, a novel trigger arm 90" is employed, as shown in greater detail in Fig. 18. Fig. 17 shows the apertured trigger arm 90' with respective end portions 82' and 92' employed in the notched bar impact test shown in all the figures up to and including Fig. 11; and Fig. 18 shows the slightly modified apertured trigger arm 90" with its end portion 92" formed downwardly so that it does not engage the stop 98 until the inner shaft 19 has turned the desired distance to accommodate the making of the test of tensile qualities in a test specimen. Its opposite end 82" is formed similarly to the end 82 of the trigger arm 90.

After the completion of either test, namely the notched bar or the tensile impact test, the broken specimens are thrown under high velocity in to the pan 32 immediately below the impact wheel 14. Here, similarly, it is preferable that the pan 32 contain or be partially filled with a sufficiently viscous medium such as grease, soap or plastic clay to absorb the blow and to prevent further marring of or damage to the severed test specimen. Such care permits of the parts of the broken specimen to be examined and its characteristics noted insofar as the type and position of the fracture is concerned, or making note of the character of the elongation and bend of the test specimen if it should not break. Study of these physical characteristics, in conjunction with accurate knowledge of the energy absorbed by the impact, supplies the testing laboratory technician with a sufficient index of material to enable him to calibrate the machine according to well-known standard impact machines of the constant speed type.

It is therefore evident that a novel testing machine of the type has been developed in which the numerous details of construction may be varied throughout a wide range without departing from the principles disclosed herein. We therefore do not propose limiting the patent granted hereon otherwise than as necessitated by the appended claims interpreted in light of the prior art.

We claim:

1. A variable velocity impact testing machine for effecting transverse and tension tests comprising a rotor having a surface portion with a different reflection factor, impact means on the said rotor, means for propelling a test specimen from a position outside the path of movement described by the said impact means to a position within the path of the said impact means and to a position of rest before being struck by the said impact means, and the said propelling means comprising a photoelectric cell operable by the surface portion of the said rotor having a different reflection factor.

2. A variable velocity impact testing machine for effecting transverse and tension tests comprising a rotor with a portion of its surface having a different reflection factor, impact means on said rotor, means for propelling a test specimen from a position outside the path of movement described by the impact means to a position within the path of said impact means and to a position of substantial immovability before being struck by the said impact means, the said means for propelling the test specimen comprising a photoelectric cell operable by the surface portion of the said rotor having a different reflection factor, a solenoid operated by the said photoelectric cell, resilient means normally tending to propel the test specimen within the path of the said impact means, and restraining means for holding the test specimen outside the path of said impact means, said solenoid operation being adapted to withdraw the said restraining means and to permit normal action of the said resilient means.

3. A variable velocity impact testing machine comprising variable speed propelling means, a rotor connected with the said propelling means, fixed impact means on the said rotor, solenoid actuated means for positioning a test specimen within the arcuate path of movement of the said fixed impact means, and disengageable means between the said rotor and the said propelling means cooperating with the said solenoid actuated means, whereby preliminary to the functioning of the said solenoid actuated specimen positioning means the propelling means for the said rotor is automatically disengaged.

4. A variable velocity impact testing machine for effecting transverse and tension tests comprising variable speed propelling means, a rotor with light reflecting means cooperating with the said propelling means, disengageable means including means cooperating with the said rotor light reflecting means positioned between the said propelling means and the said rotor, fixed impact means on the said rotor, means for positioning a test specimen within the path of the said fixed impact means in a predetermined relation with the said impact means, and combined electric-optical control means between the said rotor and the said positioning means, whereby upon functioning of the said latter means by the rotor light reflecting means the rotative motion of the said rotor is substantially unaffected by avoidance of drag upon the said rotor.

5. A variable velocity impact testing machine comprising a variable speed propelling motor, a rotor cooperating with the said propelling motor, a clutch intermediate the said propelling motor and rotor, electrical solenoid means for disengaging said clutch, striking dogs on the said rotor, a holder and electric solenoid means for positioning a test specimen within the path described by the said striking dogs, and a photoelectric cell excited by the said rotor actuating the said electric solenoid, whereby upon actuation of the said first named electric solenoid means by the photoelectric cell the rotative motion of the said rotor is unaffected and is free of engagement with the said clutch to the extent that no mechanical energy is thereby lost, the rotor thereby operating free of the motor.

6. A variable speed impact testing machine comprising propelling means, a rotor driven by the said propelling means, the said rotor having impact means thereon, optical-electrical positioning means cooperating with the said rotor for placing a test specimen in the path of movement of said impact means and including means for holding the test specimen motionless at the instant of impact, clutch means between the propelling means and the said rotor, and electric means cooperating with the said clutch means for disengaging said clutch means before placing the test specimen in the path of movement of said impact means.

7. A variable speed impact testing machine comprising propelling means, a rotor driven by the said propelling means, the said rotor having spaced projections extending from the periphery thereof, positioning means for placing a test specimen in the path of movement of the said spaced projections, the said positioning means including respectively an anvil for supporting a test specimen at its end portions, a holder therefor, and electrically actuated insertion means for moving the test specimen from a position outside the path of the spaced projections of the rotor to a position within the path of the said projections, including means for holding the test specimen relatively motionless at the inception of impact with the said projections, clutch means between the propelling means and the said rotor, and means for disengaging the said clutch means immediately before placing the test specimen in the path of movement of said projections.

8. A variable velocity impact testing machine for effecting transverse and tension tests comprising a rotor, fixed impact means on the said rotor, positioning means for a test specimen cooperating with the said rotor and the said fixed impact means, light reflecting areas on said rotor, a light source, and light sensitive means coordinated with the motion of said rotor through light reflected by said areas for actuating said positioning means whereby the engagement between the said fixed impact means on the rotor and the test specimen is timed by the said positioning means.

9. A variable velocity impact testing machine for effecting transverse and tension tests comprising a rotor, fixed impact means on the said rotor, positioning means for a test specimen, the said positioning means cooperating with the said rotor and the said fixed impact means, light reflecting areas on said rotor, a light source, and light sensitive means coordinated with the motion of said rotor through light reflected by said areas for actuating said positioning means whereby when the latter means is actuated by light reflected from the said rotor the test specimen is positioned in the path of movement of the said impact means and is motionless before being struck by the said impact means.

10. A variable velocity impact testing machine for effecting transverse and tension tests comprising a rotor, fixed striking edge or edges on the periphery of the said rotor, positioning means for a test specimen, light reflecting portions on the said rotor, a light source, the said positioning means having electrical means actuated through the light reflecting portions of the said rotor with the said fixed striking edge or edges, and said electrical means including light sensitive means actuated by said light reflecting portions of the said rotor for establishing the introduction of the test specimen by the said positioning means at a position immediately ahead of the approaching striking edge or edges on the said rotor.

JEROME J. KANTER.
WATT V. SMITH.